No. 861,984. PATENTED JULY 30, 1907.
M. W. HOGLE & W. W. SLICK.
SHEARING APPARATUS.
APPLICATION FILED MAY 21, 1906.
3 SHEETS—SHEET 1.
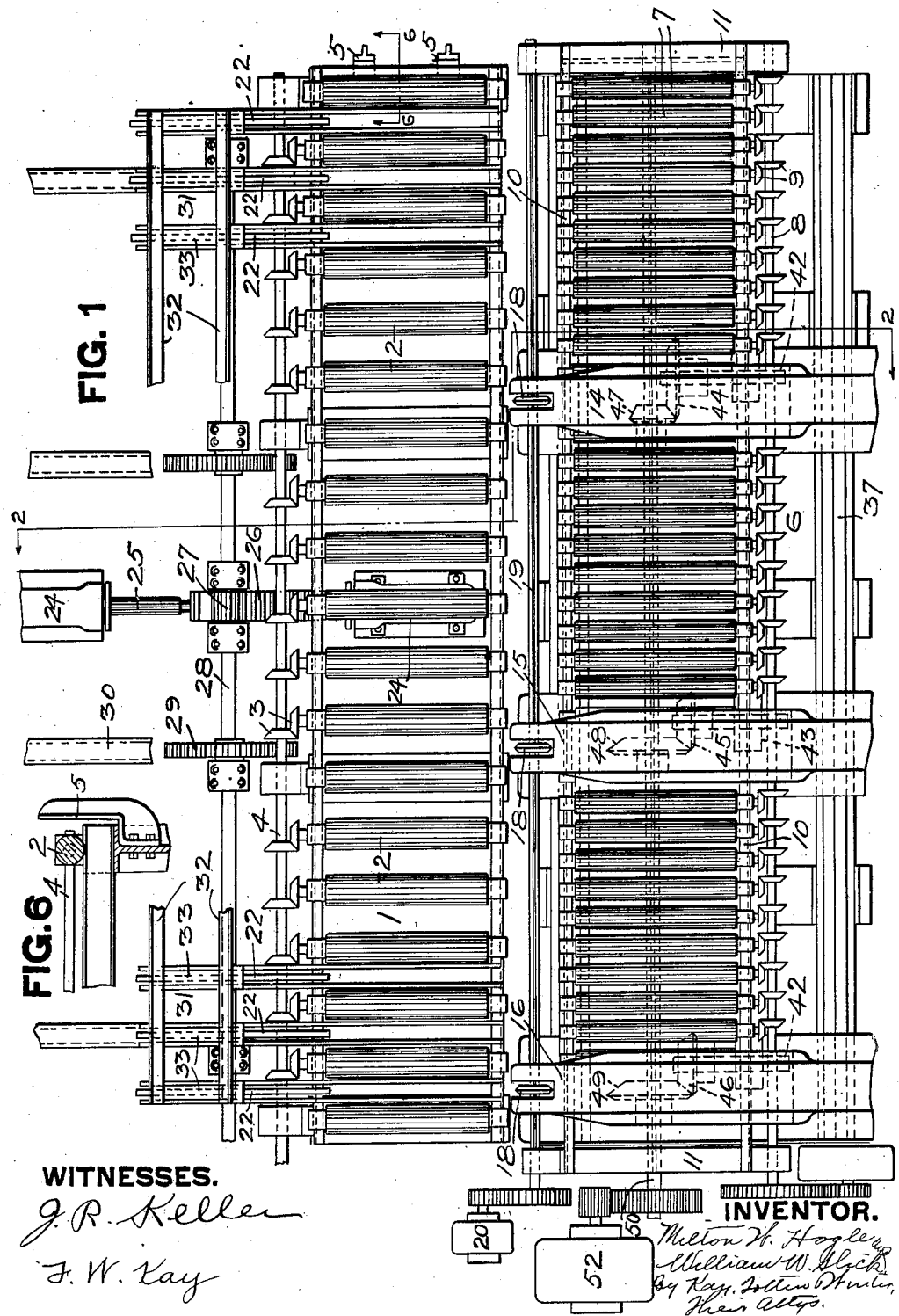
WITNESSES.
INVENTOR.

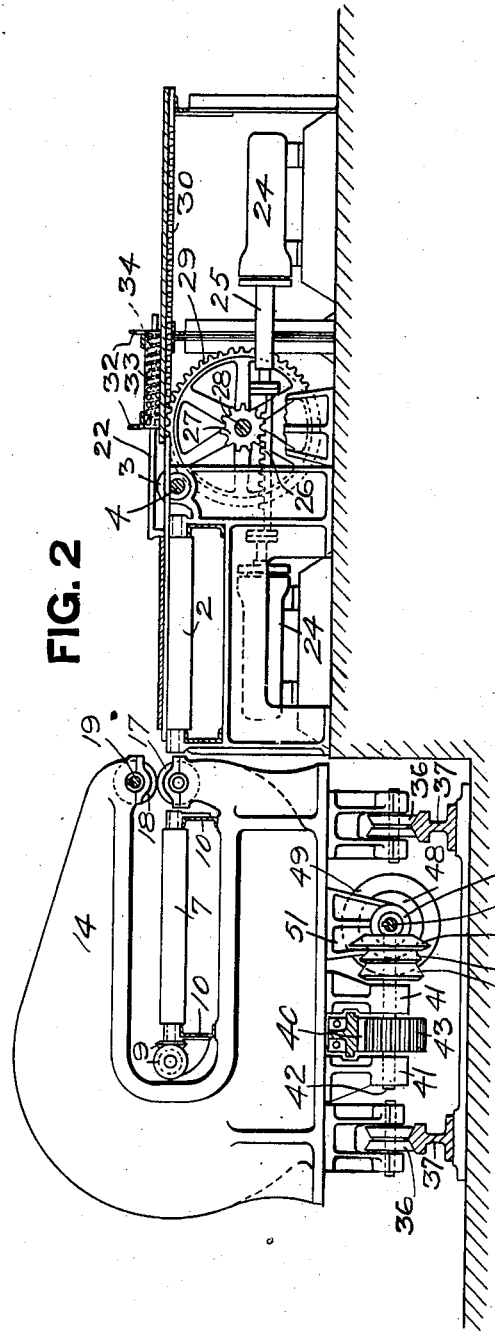

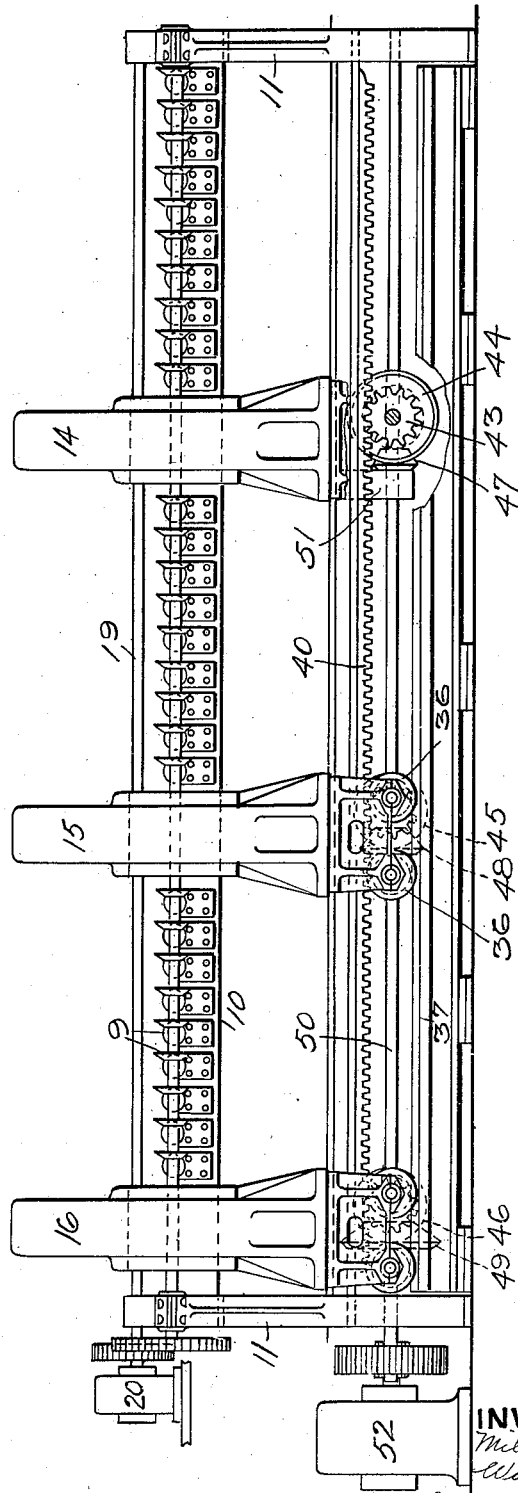

UNITED STATES PATENT OFFICE.

MILTON W. HOGLE AND WILLIAM W. SLICK, OF PITTSBURG, PENNSYLVANIA, ASSIGNORS TO PERCY E. DONNER, OF PITTSBURG, PENNSYLVANIA.

SHEARING APPARATUS.

No. 861,984.      Specification of Letters Patent.      Patented July 30, 1907.

Application filed May 21, 1906. Serial No. 318,012.

*To all whom it may concern:*

Be it known that we, MILTON W. HOGLE and WILLIAM W. SLICK, residents of Pittsburg, in the county of Allegheny and State of Pennsylvania, have invented a new and useful Improvement in Shearing Apparatus; and we do hereby declare the following to be a full, clear, and exact description thereof.

This invention relates to severing mechanism, such as shearing or sawing mechanism, and is adapted to provide mechanism of this character having a plurality or series of cutters shiftable with reference to each other but in a manner to preserve uniformity of spacing therebetween, so that by said mechanism long bars, plates, sheets, or other articles, can be severed into sections of any desired length, but the sections of any one cutting being uniform in length.

In many arts, such as in sheet metal rolling, it is necessary and desirable to cut long plates, sheets, bars, or other articles, into a number of sections of uniform length, but which, for different orders or different articles, must be of various lengths. To accomplish this expeditiously and in a manner to insure uniformity of output is the object of our invention.

The invention consists, generally stated, in a series of shiftable cutters, together with shifting mechanism therefor so arranged that the several cutters may be shifted in either direction but in such a manner as to preserve uniformity of spacing between the several cutters.

In the accompanying drawings Figure 1 is a plan view of our improved cutting mechanisms, parts being broken away; Fig. 2 is a transverse section on the line 2—2, Fig. 1; Fig. 3 is a side elevation of the same; Fig. 4 is a sectional detail on the line 4—4, Fig. 1; and Figs. 5 and 6 are detail views of parts of the mechanism.

Our cutting mechanism, as shown, comprises a receiving table 1 composed of a series of live rollers 2 driven in the usual way by bevel gears 3 from the shaft 4, said table having at one end a stop or stops 5 for positioning the long bar, sheet, plate, or other article on the table. At the side of the receiving table is a cutting table 6 composed of live rollers 7 driven from a longitudinal shaft 8, by bevel gears 9. The rollers 7 are mounted on stationary beams 10 secured at their ends to the stands or frames 11. Mounted in or over the shear table are a series of cutters 14, 15, 16, etc., the drawings showing three such cutters, but obviously the number can be multiplied as desired. These cutters are shown as rotary shears comprising a lower disk 17 and an upper disk 18, which may be driven by any suitable mechanism. As shown, the top disks are mounted on a shaft 19 driven from any suitable source, uch as from a motor 20. The several disks are splineds or otherwise secured to the shaft so as to be movable along the same. The several cutters are so arranged that there are uniform distances between the stops 5 and the first set of cutters, and between the succeeding adjacent sets of cutters. The article to be cut is pushed sidewise into these cutters and severed into lengths, this being effected by pushers 22 actuated by any suitable mechanism. The drawings show for this purpose power cylinders 24 whose piston rods 25 are connected to a rack bar 26 engaging a pinion 27 on a shaft 28. This shaft carries a number of gears 29 which engage racks 30 on the transversely movable slides 31. The several slides 31 are connected by the longitudinal angle bars 32 so as to move in unison, and carry boxes 33 containing compression springs 34 to which the pushers 22 are attached. The object of the springs is to permit the pushers to yield in case they strike against the cutters or other obstruction. The operation of these pushers will be readily understood from the description and drawings.

The frames or housings for the several cutters 14, 15, 16, etc. are mounted on rollers or wheels 36 running on rails or tracks 37 on the mill floor. In order to shift said frames to vary the spaces between the cutters but to preserve this spacing uniform at all times the following mechanism is provided: A stationary rack bar 40 has its ends secured to the stands 11 and lies just below the shear frames or housings. Depending from each shear frame are hangers or pillow blocks 41 in which is mounted a transverse shaft 42 carrying a gear 43 meshing with the rack bar 40. The several transverse shafts are provided with beveled gears 44, 45 and 46 which mesh with companion beveled gears 47, 48 and 49 on a longitudinal shaft 50 mounted in hangers 51 depending from the shear frames and in stationary bearings in the end frames or stands 11. This shaft is driven in any suitable manner, such as from the motor 52. The pinions 47, 48 and 49 are either splined to the shaft 50 or otherwise secured thereto so as to rotate therewith but to be movable along the same.

The several sets of beveled gears 44—47, 45—48 and 46—49 are of varying sizes, as shown, the arrangement being such that the transverse shaft 42 of each of the shears in the series is driven at a higher speed than the one on the shear immediately preceding the same in the series, so that thereby the several shears are shifted through increasing distances in series. The ratio of the several sets of beveled gears is as 1, 2, 3, etc. so that if the first shear is shifted 1 ft. the second shear will be shifted 2 ft., the third shear 3 ft., the fourth shear 4 ft. and so on to the end of the series. Consequently the distances between adjacent sets of shears is always the same although this distance may be varied within wide limits.

When it is desired to shift the shears it is only necessary to rotate the shaft 50, and, through the gearing described, the several shears are shifted in the proper direction and to the desired extent but without destroying uniformity of distance between adjacent shears. Consequently it is possible to cut a long bar, sheet, plate, or other article, into a number of pieces all of the same length and, at will increase or decrease the length of the pieces to be cut.

What we claim is:

1. Cutting mechanism comprising in combination, a plurality of shiftable cutters, a stationary rack bar, a series of gears meshing with said rack bar, one mounted on each cutter, and driving mechanism for said gears arranged to shift the cutters through increasing distances in series.

2. Cutting mechanism comprising in combination, a plurality of shiftable cutters, actuating mechanism therefor, and shifting mechanism for said cutters comprising a rack bar, a series of gears meshing with said rack bar, one for each cutter, and driving mechanism for said several gears arranged to drive the same with increasing speed in series.

3. Cutting mechanism comprising in combination, a plurality of shiftable cutters, shiftable mechanism for said cutters comprising a stationary rack bar, a series of gears meshing with said rack bar, one mounted on each of said cutters, and driving mechanism for said gears arranged to shift the cutters through distances which vary through the series according to multiples of the shifting distance of the first cutter.

4. Cutting mechanism comprising in combination, a plurality of shiftable cutters, actuating mechanism therefor, and shifting mechanism for said cutters comprising a rack bar, a series of gears meshing with said rack bar, one for each cutter, and driving mechanism for said several gears arranged to drive the same at increasing speeds in series in the ratio of 1, 2, 3, etc.

5. Cutting mechanism comprising in combination, stationary end frames, a series of cutter carrying frames mounted on rollers and traveling between the end frames, and shifting mechanism connected to said cutter frames and arranged to shift the several cutters varying distances in series.

6. Cutting mechanism comprising in combination, stationary end frames, a series of cutters, each mounted on a carriage movable on ways between the end frames, a rack bar secured to said end frames, a gear mounted on each cutter carriage and meshing with said bar, and driving mechanism for said several gears arranged to shift the cutter carriages through increasing distances in series.

7. Cutting mechanism comprising in combination, a receiving table, a stop therein, a plurality of shiftable cutters, and shifting mechanism for said cutters comprising a stationary rack bar, a gear mounted on each cutter and meshing with said rack bar, and driving mechanism for said gears arranged to shift the several cutters through increasing distances in series.

8. Cutting mechanism comprising in combination, a receiving table, a stop therein, a cutting table at the side of said receiving table, a plurality of shiftable cutters in said cutting table and in advance of the stop, shifting mechanism for said several cutters arranged to shift the same through different distances and in a manner to preserve uniformity of spacing between adjacent cutters and between the first cutter of the series and the stop, and mechanism for pushing the work from the receiving table on to the cutting table.

In testimony whereof, we the said MILTON W. HOGLE and WILLIAM W. SLICK have hereunto set our hands.

MILTON W. HOGLE.
WILLIAM W. SLICK.

Witnesses:
ROBERT C. TOTTEN,
J. R. KELLER.